(No Model.)
A. HENDEY.
LUBRICATOR.
No. 462,863. Patented Nov. 10, 1891.
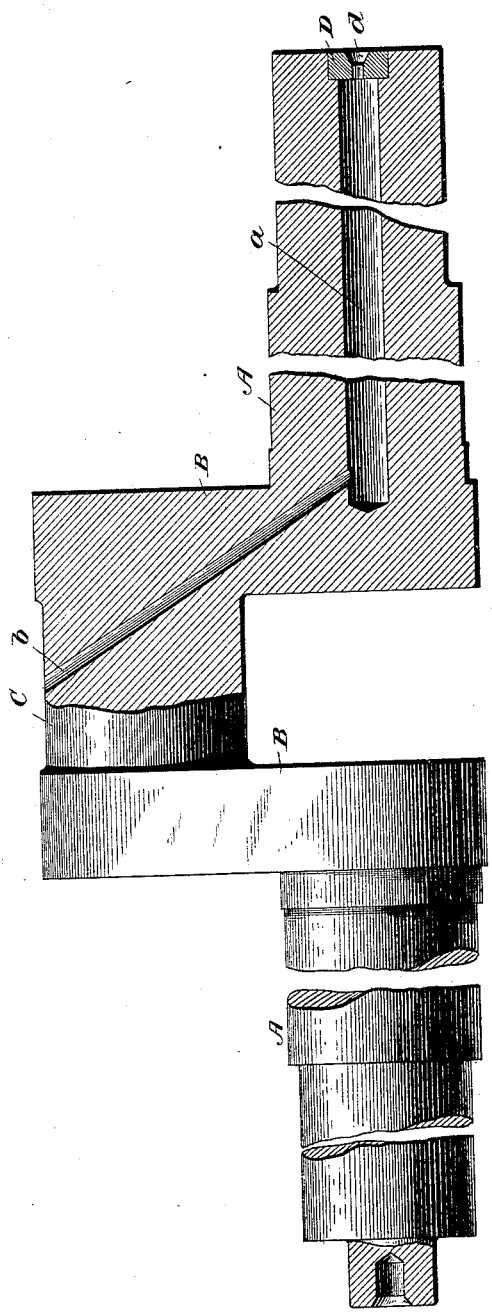
WITNESSES:
Edwin L. Bradford
A. F. Randall
INVENTOR
Arthur Hendey
BY
V. D. Stockbridge
ATTORNEYS

UNITED STATES PATENT OFFICE.

ARTHUR HENDEY, OF DENVER, COLORADO.

LUBRICATOR.

SPECIFICATION forming part of Letters Patent No. 462,863, dated November 10, 1891.

Application filed May 27, 1891. Serial No. 394,273. (No model.)

*To all whom it may concern:*

Be it known that I, ARTHUR HENDEY, a citizen of the United States, residing at Denver, in the county of Arapahoe and State of Colorado, have invented certain new and useful Improvements in Lubricators; and I do hereby declare that the following is a full, clear, and exact description of the invention, such as will enable others skilled in the art to which it appertains to make and use the same.

My invention relates to lubricators for the crank and connecting-rod of revolving crank-shafts.

The invention consists in the combination of a shaft provided with an axial pocket or recess constituting a reservoir in said shaft, a crank arm and pin having duct leading from the axial pocket or reservoir to surface of the crank-pin, and a plug in the end of the shaft for holding the lubricant in the pocket.

It also consists in other details hereinafter described and claimed.

In the drawing the figure is a section of a center crank-engine shaft, showing my invention.

A is the shaft, B the crank-arms, and C the crank-pin. The shaft is bored or provided with a pocket $a$, and leading from it to the pin C is a duct or passage $b$.

D is by preference a steel plug provided with a countersink $d$ and a central perforation, as shown. This plug serves the purpose of holding oil or other lubricant in the pocket up to the level of the perforation, and also serves as a fixed center-piece to enable the shaft to be placed in the lathe and exactly centered at any time.

In operation the oil or other lubricant gravitates to the mouth of the duct $b$, and is thence thrown by centrifugal force to the crank-pin, and thus automatically keeps the pin and the connecting-rod lubricated as long as there is material in the pocket $a$. The central perforation in the plug D affords a convenient means of introducing the lubricant.

It is obvious that the plug may have merely a vent-hole, and the lubricant may be inserted through a lateral opening, afterward plugged up, or through the duct $b$. It is also obvious that this lubricating arrangement may be applied to any revolving crank-shaft, as well as that of a center-crank engine.

Having now described my invention, what I claim is—

1. The combination of a shaft having a reservoir in said shaft, a crank arm and pin having a duct leading from the reservoir to the surface of the pin, and a plug in the end of the shaft, substantially as described.

2. The combination of a shaft having axial pocket or reservoir, a crank and pin having a duct leading from the reservoir to the surface of the pin, and a steel countersunk plug for closing the pocket and centering the shaft, substantially as described.

In testimony whereof I affix my signature in presence of two witnesses.

ARTHUR HENDEY.

Witnesses:
GEO. L. HOOPER,
H. HANINGTON, Jr.